US012656910B2

(12) United States Patent
Sun et al.

(10) Patent No.: US 12,656,910 B2
(45) Date of Patent: Jun. 16, 2026

(54) METHOD AND SYSTEM FOR EDGE MISTOUCH REJECTION ON TOUCHSCREEN DEVICES

(71) Applicant: STMicroelectronics International N.V., Geneva (CH)

(72) Inventors: Guodong Sun, Beijing (CN); Yue Ding, Beijing (CN); Bin Fan, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/899,471

(22) Filed: Sep. 27, 2024

(65) Prior Publication Data

US 2026/0093361 A1     Apr. 2, 2026

(51) Int. Cl.
*G06F 3/041* (2006.01)

(52) U.S. Cl.
CPC .................................. *G06F 3/04186* (2019.05)

(58) Field of Classification Search
CPC .................................................... G06F 3/04186
See application file for complete search history.

(56) References Cited

U.S. PATENT DOCUMENTS

| | | | | |
|---|---|---|---|---|
| 9,785,278 | B2 * | 10/2017 | Yoshida ................. | G06F 3/0484 |
| 10,013,163 | B2 * | 7/2018 | Schönleben ........ | G06F 3/04817 |
| 10,831,296 | B1 * | 11/2020 | Zhang .................. | G06F 3/0412 |
| 11,093,069 | B2 * | 8/2021 | Jeong .................... | G06F 3/0416 |
| 12,360,636 | B1 * | 7/2025 | Takkar ...................... | G06T 3/02 |
| 2010/0117970 | A1 * | 5/2010 | Burstrom ............ | G06F 3/04883 345/173 |
| 2012/0154294 | A1 * | 6/2012 | Hinckley .............. | G06F 3/0416 345/173 |
| 2012/0262407 | A1 * | 10/2012 | Hinckley ............ | G06F 3/04883 345/173 |
| 2013/0076644 | A1 * | 3/2013 | Escobedo ........... | G06F 3/04186 345/173 |
| 2013/0222287 | A1 * | 8/2013 | Bae ..................... | G06F 3/04186 345/173 |
| 2013/0234982 | A1 * | 9/2013 | Kang .................. | G06F 3/04186 345/174 |
| 2013/0257768 | A1 * | 10/2013 | Lee ........................ | G06F 3/0488 345/173 |
| 2013/0271395 | A1 * | 10/2013 | Tsai ........................ | G06F 3/041 345/173 |
| 2014/0043265 | A1 * | 2/2014 | Chang ................. | G06F 3/04883 345/173 |
| 2014/0237412 | A1 * | 8/2014 | Yoon ................... | G06F 3/04886 715/773 |
| 2014/0310661 | A1 | 10/2014 | Frederickson et al. | |

(Continued)

FOREIGN PATENT DOCUMENTS

| | | |
|---|---|---|
| CN | 113934313 A | 1/2022 |

*Primary Examiner* — Ibrahim A Khan
(74) *Attorney, Agent, or Firm* — Slater Matsil, LLP

(57) ABSTRACT

A method of operating an electronic device includes detecting a plurality of touch inputs for a number of frames on an edge zone of a touchscreen of the device, determining a distance between adjacent touch input within an expanded edge zone, in response to the distance being less than a threshold distance, rejecting the touch inputs as invalid, and in response to the distance being greater than the threshold distance, accepting the touch inputs as valid.

20 Claims, 8 Drawing Sheets

(56)  References Cited

U.S. PATENT DOCUMENTS

| | | | |
|---|---|---|---|
| 2015/0015506 A1* | 1/2015 | Lares | G06F 3/041 |
| | | | 345/173 |
| 2015/0022471 A1* | 1/2015 | Kwak | G06F 1/3265 |
| | | | 345/173 |
| 2016/0283035 A1 | 9/2016 | Sandblad et al. | |
| 2017/0220176 A1* | 8/2017 | Park | G06F 1/1694 |
| 2017/0336914 A1* | 11/2017 | Okumura | G06V 40/10 |
| 2018/0107339 A1* | 4/2018 | Dai | G06F 3/0488 |
| 2018/0292974 A1* | 10/2018 | Lee | G06F 3/04883 |
| 2019/0079576 A1* | 3/2019 | Liu | G06F 3/04166 |
| 2019/0079613 A1* | 3/2019 | Zhang | H04M 1/0266 |
| 2019/0302961 A1* | 10/2019 | Hua | G06F 3/04886 |
| 2020/0293144 A1* | 9/2020 | Heo | G06F 3/0412 |
| 2021/0278897 A1 | 9/2021 | Oliver et al. | |
| 2023/0012245 A1 | 1/2023 | Li et al. | |
| 2024/0160319 A1* | 5/2024 | Lee | G06F 3/0446 |

* cited by examiner

100

108

104

112

102

116

118

400

600

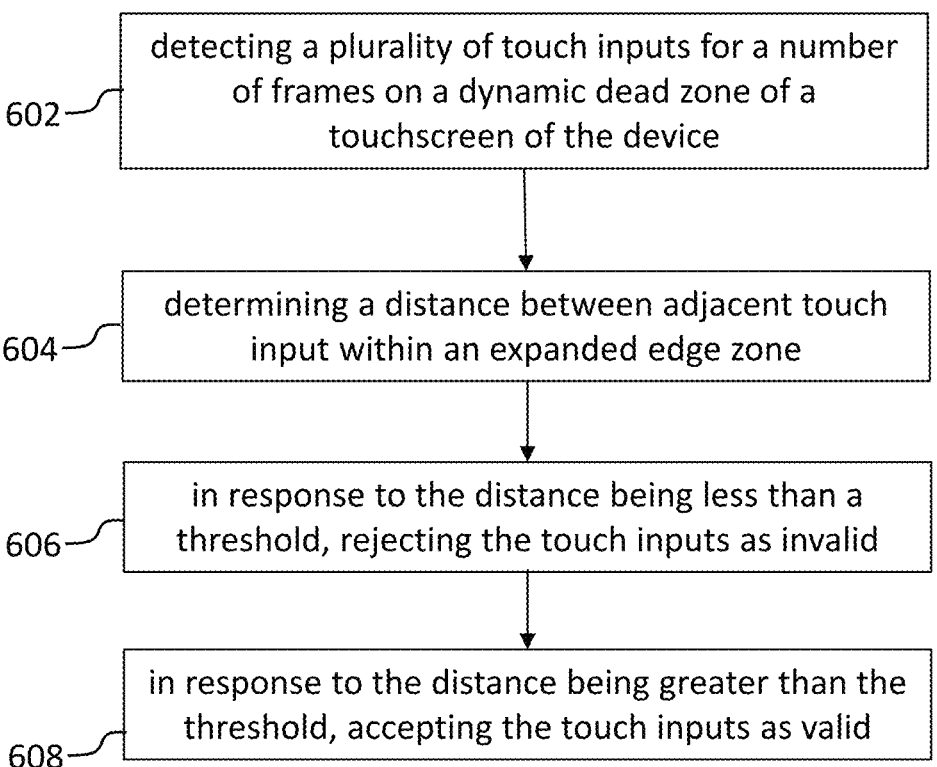

602 —| detecting a plurality of touch inputs for a number of frames on a dynamic dead zone of a touchscreen of the device 604 —| determining a distance between adjacent touch input within an expanded edge zone 606 —| in response to the distance being less than a threshold, rejecting the touch inputs as invalid 608 —| in response to the distance being greater than the threshold, accepting the touch inputs as valid

FIG. 6

METHOD AND SYSTEM FOR EDGE MISTOUCH REJECTION ON TOUCHSCREEN DEVICES

TECHNICAL FIELD

The present invention relates generally to touchscreen devices and, in particular embodiments, to a method and system for edge mistouch rejection on touchscreen devices.

BACKGROUND

Touchscreen devices are commonly used for smartphones, tablets, and various other electronic devices. In recent years, there has been a push away from the more traditional methods, as consumers prefer the convenience of portable devices that can support a more flexible lifestyle. To this end, there has been a rise in smaller, portable, handheld electronic devices, such as mobile phones, tablets, gaming systems, etc. This has given rise to the popularity of touchscreen device with narrow bezels or curved edges that maximize the screen-to-body ratio of devices so that the devices remain portable.

While these designs have enhanced the aesthetic appeal and functionality of touchscreen devices, they have also introduced challenges in touch input detection and interpretation. These devices rely on touch-sensitive displays to detect user input through taps, swipes, and other gestures. Handheld touchscreen devices may encounter unintended touch inputs on the edge of the display, or edge mistouch, when held by a user. The edge mistouch may cause accidental app launches, unintended scrolling, or other unwanted actions, particularly when users are holding the device in various orientations or grips.

SUMMARY

One general aspect includes a method of operating an electronic device. The method includes detecting a plurality of touch inputs for a number of frames on an edge zone of a touchscreen of the device; determining a distance between adjacent touch input within an expanded edge zone; in response to the distance being less than a threshold distance, rejecting the touch inputs as invalid; and in response to the distance being greater than the threshold distance, accepting the touch inputs as valid.

Another general aspect includes a method of operating a touchscreen device having a first edge zone and a second edge zone along an edge of a touchscreen of the touchscreen device, the first edge zone having a first width and the second edge zone having a second width that is larger than the first width of the first edge zone. The method includes: detecting touch inputs on the first edge zone; determining that there are at least two touch inputs on the second edge zone; in response to determining that there are at least two touch inputs on the second edge zone, expanding the second width of the second edge zone; and measuring a distance between adjacent touch inputs on the second edge zone.

Another general aspect includes a device that includes a display layer comprising a plurality of pixels; a touch sensing layer adjacent the display layer, the touch sensing layer comprising a plurality of sensors, each sensor associated with one or more of the pixels; a touch controller; and a non-transitory memory storing a program to be executed by the touch controller. The program includes instructions to: detect a plurality of touch inputs for a number of frames on an edge zone of a touchscreen of the device; determine a distance between adjacent touch input within an expanded edge zone; in response to the distance being less than a threshold distance, rejecting the touch inputs as invalid; and in response to the distance being greater than the threshold distance, accepting the touch inputs as valid.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates a flowchart of a method of operating an electronic device with a touchscreen according to an embodiment of the present application.

DETAILED DESCRIPTION OF ILLUSTRATIVE EMBODIMENTS

Embodiments of the present invention relate to a handheld touchscreen device. Various embodiments of the present application disclose a device and a method to detect touch inputs on edge zones of the touchscreen.

To improve the user experience of a handheld touchscreen device, the method detects touch inputs on the edge of the touchscreen and dynamically adjusts dead zones and edge zones based on a number and location of detected touch inputs. When touch inputs are detected within a dynamic dead zone for a predetermined number of frames, those inputs may be rejected as invalid. When multiple touch inputs are detected within an expanded dynamic edge zone, the distance between adjacent touch inputs is evaluated against a threshold to determine whether the touch input is valid.

When the touch inputs are detected on the edge of the touchscreen, a touch controller may determine whether the touch input is valid or invalid based on a duration of the touch input and the number of touch inputs. Touch controllers can detect input signals, such as a finger touch, and convert the input signal into a measurable signal to be calculated and processed by controller software algorithms to determine the touch position on the screen.

Embodiments of the invention can prevent unintended selections caused by a user holding the device in a way that typically does not indicate the user's intent to make a selection on the touchscreen. Embodiments of the invention can also provide more accurate detection between intentional user inputs and unintended edge touches from gripping the device. The dynamic adjustment of zones based on detected input patterns allows the rejection criteria to adapt to different usage scenarios and grip styles. By evaluating multiple frames and adjacent input distances, the method can identify and filter out unintended inputs while preserving responsiveness for valid user interactions near the screen edges.

Figure 1A:
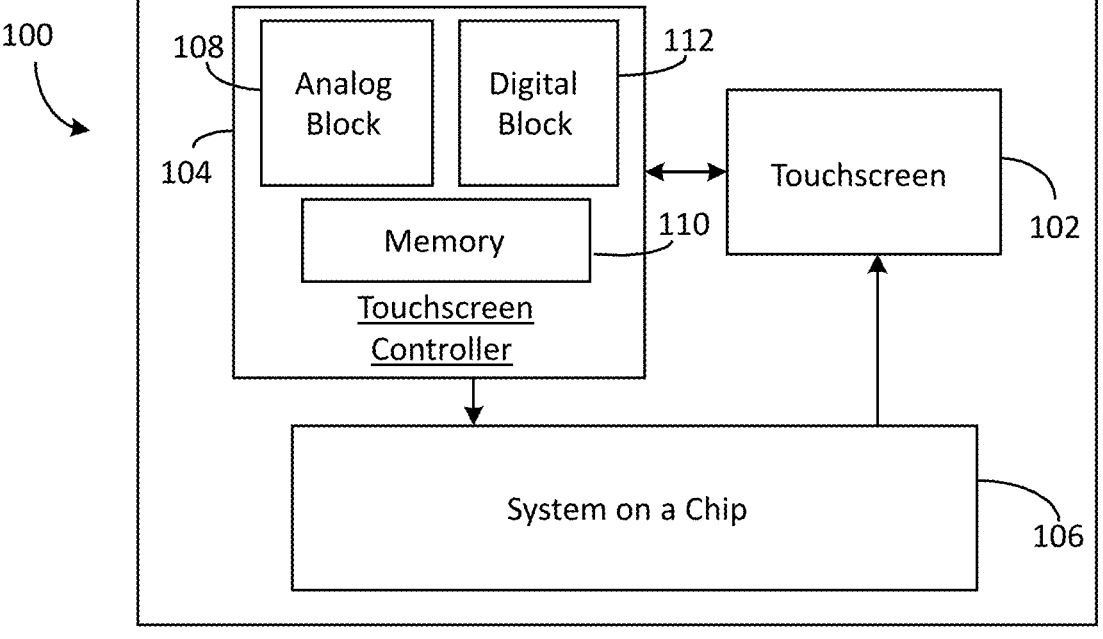
FIG. 1A illustrates a component schematic of a touchscreen device according to an embodiment of the present application.
Figure 1B:
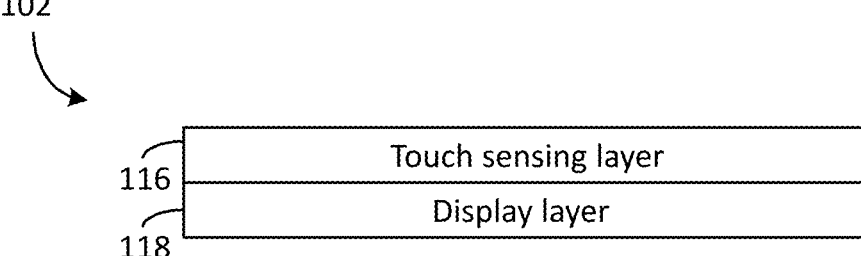
FIG. 1B illustrates a component schematic of a display of the touchscreen device according to an embodiment of the present application.
Figure 1C:
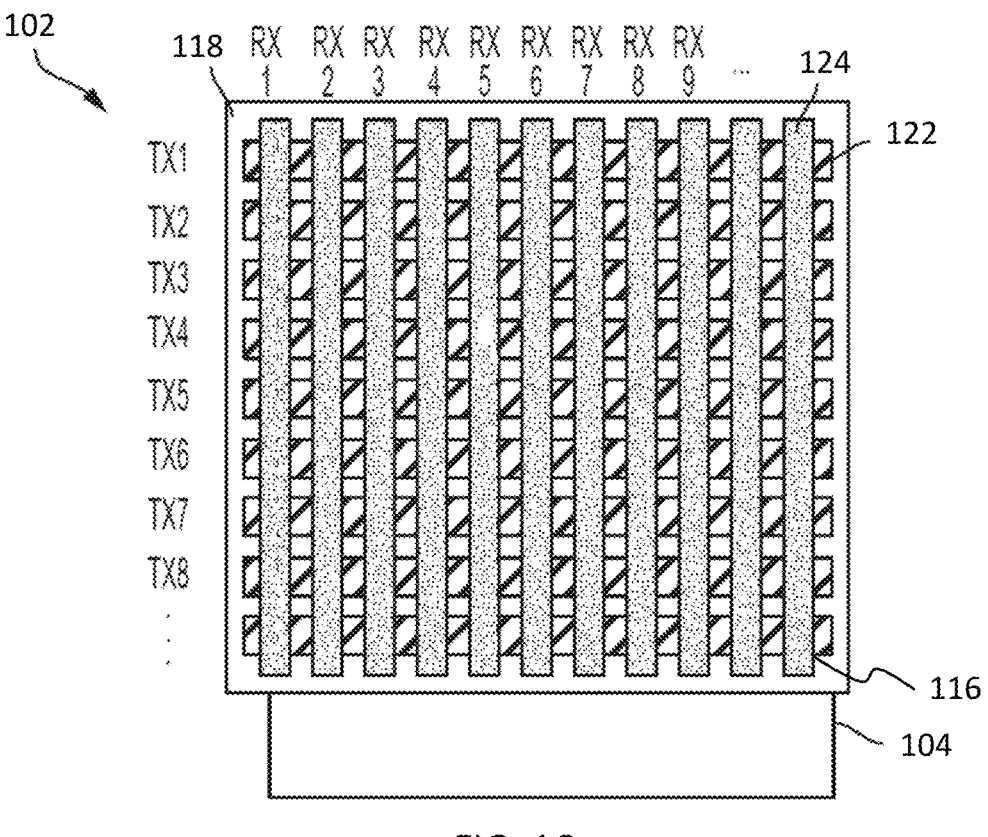
FIG. 1C illustrates a component schematic of a touch sensitive layer of the touchscreen device according to an embodiment of the present application.

FIGS. 1A-1C illustrate a touchscreen device system in various views. FIG. 1A shows a cross-sectional view of an electronic device 100. FIG. 1B presents a block diagram of the internal components of the electronic device 100. FIG. 1C depicts a detailed view of the touchscreen layers.

FIG. 1A illustrates a component schematic of an electronic device according to an embodiment of the present application.

Referring to FIG. 1A, an electronic device 100 may include a touchscreen 102, a touchscreen controller 104, and a system on a chip (SoC) 106. The electronic device 100 may be a smart phone, a GPS device, a tablet computer, a mobile media player, a laptop, a gaming system, a personal computer, or any other electronic device that may utilize touch sensitive display.

The touchscreen 102 may be an organic light emitting diode (OLED) display, an LED display, or any other type of display. The touchscreen 102 may include a plurality of pixels in a display layer configured to display an image. As understood by those with ordinary skill in the art, the display layer of the touchscreen 102 may include the plurality of pixels positioned at each of the intersections between the data lines and scan lines. The plurality of scan lines may extend across the rows of the touchscreen 102, and data lines that extend across the columns of the touchscreen 102 in a matrix like formation. The touchscreen 102 may also include a touch sensing layer configured to detect touch inputs made on the touchscreen 102.

The touchscreen controller 104 may perform various methods with respect to the display. In various embodiments, the touchscreen controller 104 may be a processor that analyzes information and carries out a series of executable scripts, e.g., stored in a memory 110. In one or more embodiments, the processor may comprise an application-specific integrated circuit (ASIC) device, a central processing unit (CPU), or any other processing unit known in the art. In various embodiments, the touchscreen controller 104 may comprise a number of separate computing units such as cores integrated within one processor, or distinct separate processing chips. Further details regarding how the touchscreen controller 104 accounts for touch inputs on an edge of the touchscreen 102 are provided below.

In various embodiments, the touchscreen controller 104 may include an analog block 108 and a digital block 112. The analog block 108 may include a plurality of analog circuits configured to measure capacitances across touchscreen 102 and convert them into digital values. The digital block 112 may comprise a variety of digital logic circuits such as DACs or digital control systems configured to obtain digital touch data from the analog block 108, process the digital touch data, and store them into memory 110.

The memory 110 may be programmed for short term and/or long term memory storage. The memory 110 may comprise various programs to be executed in the touchscreen controller 104. The memory 110 may include a non-transitory computer readable medium that stores instructions for execution by the touchscreen controller 104. The memory 110 may include both volatile and non-volatile memories. The memory 110 is designed to retain information generated by the touchscreen controller 104 so it can be recalled at a later time.

In various embodiments, the system on a chip 106, may also be known as an application processor, and may comprise a processor, interface, circuitry, and/or the like configured to direct the flow of input and output data to the touchscreen 102 and the associated touchscreen controller 104. The system on a chip 106 may be configured to receive touch inputs or touch event data from the touchscreen controller 104 and interpret the touch input or touch event data based on a user interface or application displayed on the touchscreen 102.

Additionally, the touchscreen controller 104 may be configured to detect touch inputs via a touchscreen 102. In other words, the touchscreen controller 104 may be configured to send touch driving signals (TDS) to the touchscreen, receive touch sensing signals (TSS) in return from the touchscreen, process the TSS to determine coordinates of touch, and report them to the system on a chip 106. Then based on the touch data collected from scanning, the touchscreen may be used by the touchscreen controller 104 to determine the coordinates of touch, and report them to the system on a chip 106. Then, the system on a chip 106 may provide an output to the touchscreen 102 based on the reported coordinates of touch.

Advantageously embodiments of the present application disclose a method for detecting touch inputs on an edge of the touchscreen and determine whether to report or ignore the touch input. In other words, touch inputs detected on the edge of the touchscreen may indicate a user is holding the phone rather than making a selection on the touchscreen.

FIG. 1B illustrates a schematic of the touchscreen 102. In various embodiments, the touchscreen 102 may include a touch sensing layer 116 and a display layer 118. The touch sensing layer 116 and the display layer 118 may be situated on a front facing side of the electronic device 100. The touch sensing layer 116 is configured to detect touch inputs made on the touchscreen 102.

FIG. 1C shows a diagram of touch channels on a touchscreen 102 according to an embodiment of the present application. FIG. 1C will be described in conjunction with the electronic device of FIG. 1A and touchscreen 102 in FIG. 1B.

The touchscreen 102 includes a touch sensing layer 116 and a display layer 118. The touch sensing layer 116 includes a plurality of TX channels 122 and RX channels 124 arranged in rows and columns across the touchscreen 102. The plurality of channels may include transmitting (TX) channels 122 and receiving (RX) channels 124. The TX channels 122 and the RX channels 124 form the touch sensing layer 116. The TX channels 122 may also be referred to as TX electrodes or TX touch sensors. The RX channels 124 may also be referred to as RX electrodes or RX touch sensors.

The TX channels 122 and RX channels 124 may span the entirety of the touchscreen 102 in a grid-like fashion that are operable by a touchscreen controller 104. In various embodiments, the TX channels 122 may be formed in rows across the touchscreen 102 and the RX channels 124 may be formed in columns across the touchscreen 102. In other embodiments, the RX channels 124 may be formed in rows across the touchscreen 102 and the TX channels 122 may be formed in columns across the touchscreen 102. The TX channels 122 and the RX channels 124 may overlap in certain embodiments.

The TX channels 122 and the RX channels 124 may be formed by electrically coupling the touchscreen 102 to rows of capacitive electrodes and columns of capacitive electrodes that span the entirety of the touchscreen 102. In various embodiments, the TX channels 122 and the RX channels 124 have a measurable mutual capacitance at their intersections. In some embodiments, the TX channels 122 and the RX channels 124 may have a self-capacitance that can be measured with respect to ground.

The touchscreen controller 104 is coupled to the TX channels 122 and the RX channels 124 that form the touch sensing layer 116. The TX channels 122 and the RX channels 124 create a matrix of intersections that act as individual touch sensors. The touchscreen controller 104 sends electrical signals through the TX channels and measures the changes in capacitance at each intersection point through the RX channels. The touchscreen controller 104 detects and locates touch inputs by analyzing the changes in capacitance across the entire grid. The touch inputs may include a finger touch, stylus or pen touch, or any contact with that touchscreen 102 that changes the capacitance in the touch sensing layer 116. For convenience, these are all referred to as a finger touch herein. The touchscreen controller 104 can process this raw data, filter out noise, and interpret the touch inputs, translating them into coordinates and gestures that the device's operating system can understand. This integration between the touchscreen controller and the sensor grid enables accurate and responsive touch detection.

Figure 2A:
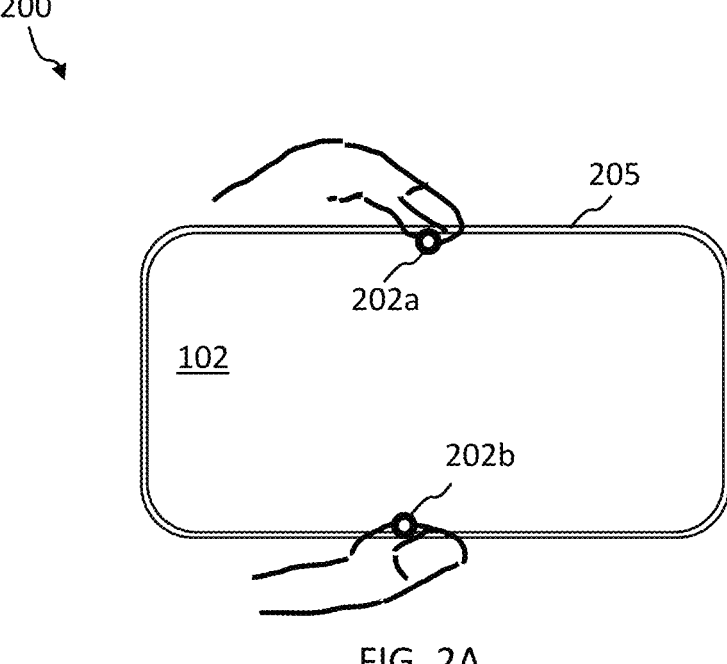
FIG. 2A illustrates an exemplary embodiment of edge touch inputs on the touchscreen device in landscape orientation according to an embodiment of the present application.
Figure 2B:
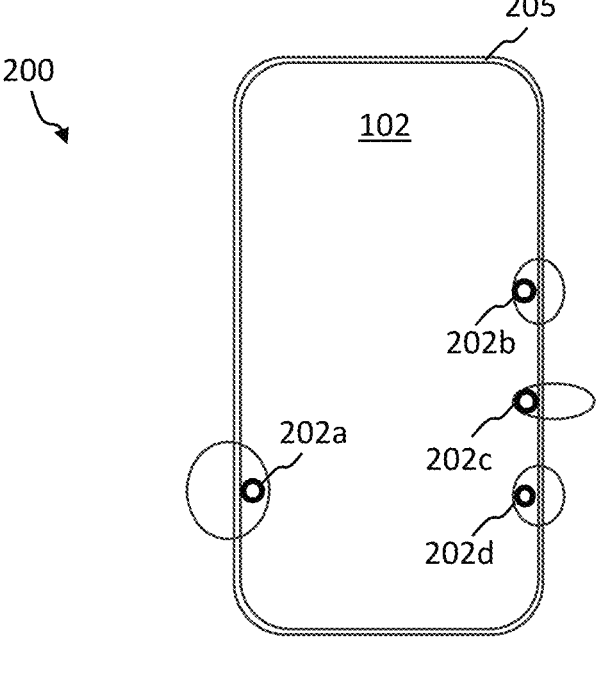
FIG. 2B illustrates an exemplary embodiment of edge touch inputs on the touchscreen device in portrait orientation according to an embodiment of the present application.

FIGS. 2A and 2B illustrate exemplary embodiments of edge touch inputs on a touchscreen device 200 according to embodiments of the present application. The touchscreen device 200 includes a touchscreen 102 which serves as the interface of a handheld touchscreen device 200. The touchscreen device 200 may include a bezel 205 surrounding the edge of the touchscreen 102. The touchscreen 102 may receive touch inputs 202 (one or a combination of touch inputs 202a, 202b, 202c, 202d). The touch inputs 202 indicate a finger touch or finger contact on the touchscreen device 200. When the touch inputs 202 are in contact with the touchscreen 102, the touch sensing layer 116 can detect capacitance changes where the touch inputs 202 are in contact with the touchscreen 102.

In FIG. 2A, the touchscreen device 200 is shown in a first orientation, which may be a landscape orientation. The touchscreen device 200 may be in landscape orientation, for example, when a user is watching a video or playing a game on the touchscreen device. In landscape orientation, a user may grip the touchscreen device 200 along an upper edge and a lower edge of the touchscreen device 200. The touchscreen 102 may receive a touch input 202a on an upper edge of the touchscreen 102 and a touch input 202b on a lower edge of the touchscreen 102. While the touch inputs 202a 202b are shown substantially in the center of the touchscreen, the touch inputs 202a 202b may be detected anywhere along the upper edge and lower edge of the touchscreen.

In some embodiments, the touchscreen 102 may receive only one of the touch inputs 202a or 202b. For example, the touch input 202a may be on the upper edge of the touchscreen and the touch input 202b may be on the bezel 205 (i.e., not in contact with the lower edge of the touchscreen).

These touch inputs 202a 202b may represent finger contacts or other forms of contact on the touchscreen 102 that may be interpreted as a touch input by the touch sensing layer 116. Other forms of contact on the touchscreen 102 may include, for example, contact with a device mount or case. In various embodiments, the touch inputs 202a and 202b are detected by the touch sensing layer 116 of the touchscreen, as previously described in relation to FIGS. 1B and 1C.

In FIG. 2B, the touchscreen device 200 is shown in a second orientation, which may be a portrait orientation. The touchscreen device 200 may be in portrait orientation, for example, when a user is reading on the device or viewing an application on the touchscreen device 200. In portrait orientation, a user may grip the touchscreen device 200 along a left edge and a right edge of the touchscreen device 200. The touchscreen 102 may receive touch inputs 202 on a left edge of the touchscreen 102 and touch inputs 202 on a right edge of the touchscreen 102.

In some embodiments, the touchscreen 102 may receive only one or a combination of the touch inputs 202a, 202b, 202c, and 202d. The touch inputs 202 may be along the left edge or the right edge of the touchscreen 102. For example, when the user grips the touchscreen device 200 with a left hand, the touchscreen 102 may receive one touch input 202a on the left edge of the touchscreen 102 and three touch inputs 202b, 202c, 202d on the right edge of the touchscreen 102. As another example, when the user grips the touchscreen device 200 with a right hand, the touchscreen 102 may receive three touch inputs 202 on the left edge of the touchscreen 102 and one touch input 202 on the right edge of the touchscreen 102. While FIG. 2B shows four touch inputs 202 along the left and right edge of the touchscreen 102, the number of touch inputs 202 on the touchscreen 102 may vary based on a width of the touchscreen device 200 and a hand size of a user.

The touchscreen device 200 may employ various techniques to analyze these touch inputs. For example, the touchscreen device 200 may consider the duration of the touch inputs, number of simultaneous touch inputs, their locations relative to the edges of the touchscreen 102, and the distances between adjacent touch inputs 202. These factors can be used to implement dynamic dead zone detection and dynamic edge zone detection to improve the accuracy of touch input interpretation. This approach allows for effective touch input processing across different device orientations and various user grip styles, enhancing the overall user experience.

Figure 3:
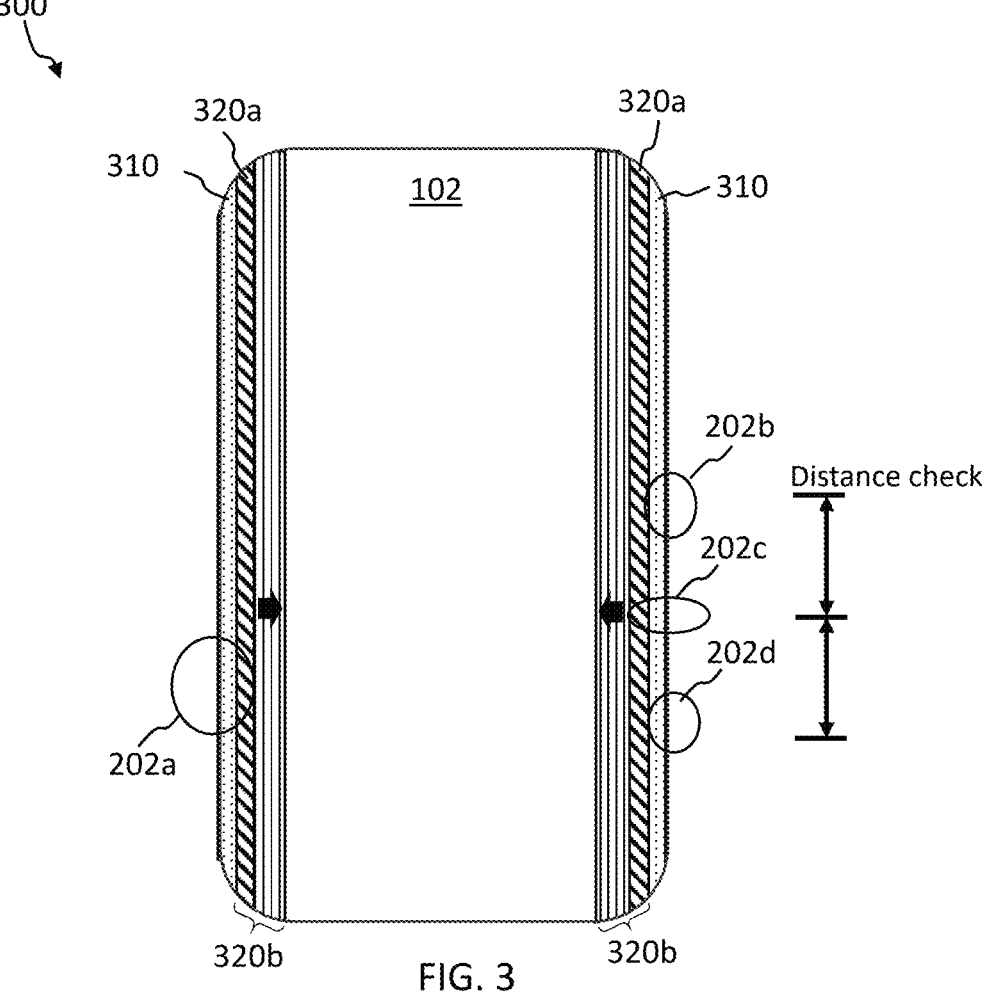
FIG. 3 illustrates a schematic representation of the touchscreen device for edge detection according to an embodiment of the present application.

FIG. 3 illustrates a schematic representation of a touchscreen device 300 with edge detection. FIG. 3 will be discussed in conjunction with FIGS. 1A-1C and FIGS. 2A-2B.

The touchscreen device 300 includes a touchscreen 102. In some embodiments, the touchscreen 102 may have a narrow bezel (as shown in FIGS. 2A-2B) surrounding the touchscreen 102 or a curved surface (not illustrated) along edges of the touchscreen 102. The touchscreen 102 can receive multiple touch inputs 202 (including 202a, 202b, 202c, and 202d). These touch inputs 202 may represent finger contacts or other forms of user interaction with the touchscreen surface. In some instances, touch inputs 202 near an edge of the touchscreen may indicate a particular grip or holding pattern by a user.

The touchscreen 102 includes dynamic dead zones 310 and dynamic edge zones 320 (including 320a and 320b). The dynamic dead zones 310 and dynamic edge zones 320 are regions along the periphery of the touchscreen 102. The dynamic dead zones 310 and dynamic edge zones 320 may be referred to as a dynamic dead zone 310 or a dynamic edge zone 320 when one (i.e., left or right) of the dynamic dead zone or dynamic edge zone is being described below.

When touch inputs 202 are detected in the dynamic dead zones 310 or dynamic edge zones 320, the touchscreen 102 can send the touch inputs to the touchscreen controller 104 to determine whether the touch input is valid or invalid. When the touch input is valid, the touchscreen controller 104 can report the touch input to the system on a chip (SoC) to interpret the touch input based on the user interface or application displayed on the touchscreen 102. The touch input may be considered valid when the touch input is caused by a user tapping or swiping on the dynamic dead zones 310 or dynamic edge zones 320 of the touchscreen 102. When the touch input is invalid, the touchscreen controller 104 rejects the touch input (i.e., does not report to the SoC). The touch inputs may be considered invalid when the touch input is caused by a user gripping or holding the touchscreen device 300. For example, referring to FIG. 2A, when the user is gripping the touchscreen device to watch a video, the touch input 202a on the upper edge of the touchscreen 102 and the touch input 202b on the lower edge of the touchscreen 102 may not be reported to the SoC.

The dynamic dead zones 310 may be narrow regions along the immediate periphery of the touchscreen 102. For example, the dynamic dead zones 310 may be on a leftmost edge and/or a rightmost edge of the touchscreen 102. Each dynamic dead zone 310 may be a length of the touchscreen 102. Each dynamic dead zone 310 may vary in width for different devices or projects. For example, each dynamic dead zone 310 may be one to three pixels in width for some devices. The dynamic dead zones 310 can be utilized to reject static touch inputs that are detected in the dynamic dead zone 310 for a predetermined number of frames. In one or more embodiments, when a static touch input is detected for at least the predetermined number of frames in the dynamic dead zone 310, the static touch input may indicate that the user is gripping or holding the device. The predetermined number of frames may be, for example, three consecutive frames.

The dynamic edge zones 320 may be narrow regions adjacent to the dynamic dead zones 310. The dynamic edge zones 320 includes a dynamic edge zone 320a and an expanded dynamic edge zone 320b. Each dynamic edge zone 320 may be a length of the touchscreen 102. Each dynamic edge zone 320a may be 13 to 30 pixels in width. The number of pixels or width for the dynamic edge zone 320 may depend on the design of the touchscreen device 300 including the physical dimensions, orientation, or user-specific settings. Touchscreen devices with curved edges may use a wider dynamic edge zone as they are more prone to accidental touches, while devices with straight edges and a thin bezel may use a narrower edge zone. For example, the dynamic edge zone 320a may be 15 pixels wide on a touchscreen device having a bezel whereas the dynamic edge zone 320a may be 30 pixels wide on a touchscreen device having a curved edge.

In one or more embodiments, when more than one touch inputs are detected in the dynamic edge zone 320a, the dynamic edge zone 320a expands to the expanded dynamic edge zone 320b. The expanded dynamic edge zone 320b can be utilized to reject multi-finger mistouch on the edge of the touchscreen 102. The expanded dynamic edge zone 320b includes the dynamic edge zone 320a. Each expanded dynamic edge zone 320b has a greater number of pixels than the dynamic edge zone 320a. For example, if the dynamic edge zone 320a is 15 pixels on a touchscreen device having a bezel and the expanded dynamic edge zone 320b may be 25 pixels. As another example, if the dynamic edge zone 320a is 30 pixels on a touchscreen device having a curved edge and the expanded dynamic edge zone 320b may be 45 pixels. The width or number of pixels of the expanded dynamic edge zone 320b may depend on a number of touch inputs detected on the dynamic edge zone 320a. For example, the expanded dynamic edge zone 320b may be fewer pixels when two touch inputs are detected than when three touch inputs are detected.

When the dynamic edge zone 320a expands to the expanded dynamic edge zone 320b, the touchscreen controller 104 measures a distance between adjacent touch inputs. For example, the touchscreen controller 104 may measure the distance between touch input 202b and touch input 202c as well as the distance between touch input 202c and touch input 202d. If the measured distance is less than a predetermined threshold, the measured distance may indicate that the user is gripping or holding the device and that the touch inputs are not intentional selections. The touchscreen device 300 can be adapted to different hand sizes and grip styles, reducing the likelihood of unintended inputs while maintaining responsiveness to intentional touches. For example, the predetermined threshold may be set based on the hand size or grip style of a user.

In various embodiments, the touchscreen device 300 can distinguish between different types of touch inputs. For example, when a user is watching a video in landscape mode with fingers resting on both edges of the device, the touchscreen controller 104 may reject these touch inputs. However, when a user taps on the edge of the screen to interact with an application on the user interface, such as to read news, the touchscreen device 300 can recognize this as an intentional interaction and respond accordingly.

In various embodiments, the touchscreen device 300 can also adapt its touch processing based on its orientation. In portrait mode, it may be more sensitive to touches along the left and right edges, while in landscape mode, it may adjust to expect more touches along the upper and lower edges.

By implementing the dynamic dead zones 310 and the dynamic edge zones 320, the touchscreen device 300 can provide a reliable and user-friendly interface by rejecting unintended touch inputs from gripping the device and recognizing intended touch inputs.

Figure 4:
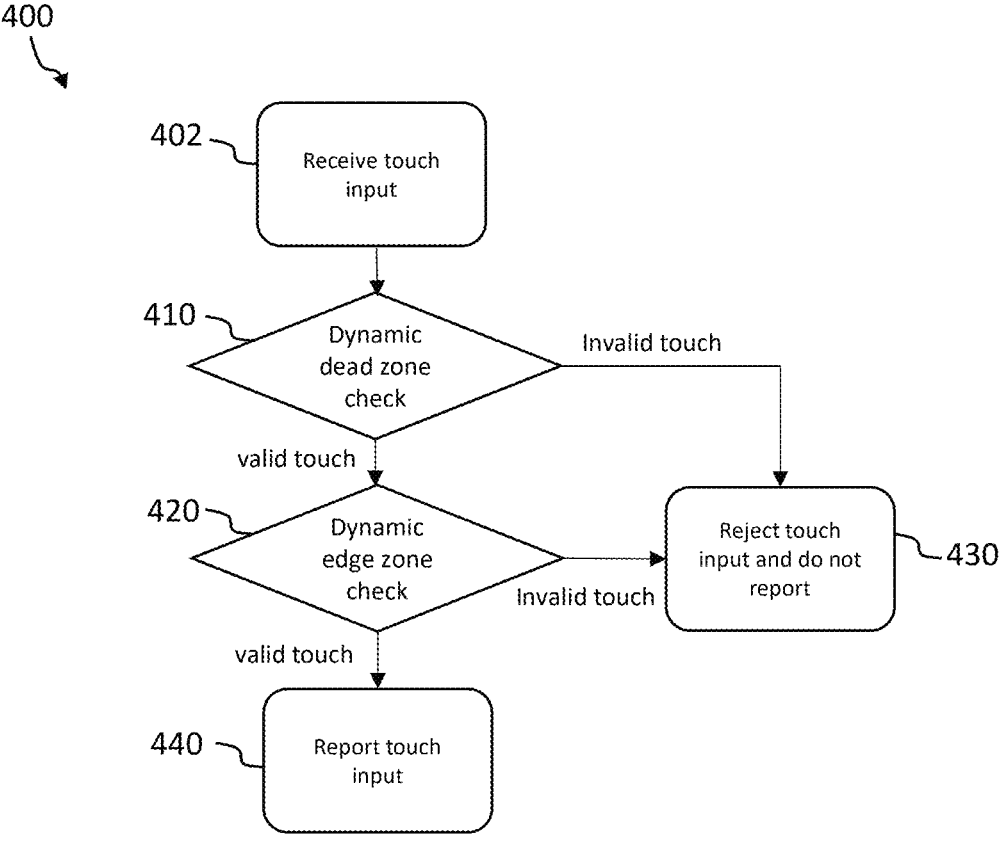
FIG. 4 illustrates a flowchart of a method for processing touch inputs according to an embodiment of the present application.

FIG. 4 illustrates a flowchart 400 of a method for processing touch inputs according to an embodiment of the present application. FIG. 4 will be described in conjunction with FIG. 3. The method incorporates the dynamic dead zone 310 and dynamic edge zone 320 to determine whether a touch input is valid (i.e., report) or invalid (i.e., reject).

The process begins with receiving a touch input 402, which represents a finger tap detected on an edge region of the touchscreen 102. Upon detecting this input, the system proceeds to perform a dynamic dead zone check 410. In various embodiments, the dynamic dead zone check 410 determines whether the detected touch input is within a predefined dynamic dead zone 310 along the edges of the touchscreen 102.

In one or more embodiments, when the dynamic dead zone check 410 determines that the detected touch input is within the predefined dynamic dead zone 310 for a predetermined number of frames, the detected touch input is determined to be an invalid touch. When the dynamic dead zone check 410 determines that the touch input is invalid, the process flows to step 430, where the touch input is rejected and not reported. The dynamic dead zone check 410 can filter out brief, unintentional touches while allowing for quick, deliberate taps near the edge of the screen.

In one or more embodiments, when the touch input is determined to be a valid touch in the dynamic dead zone check 410, the process proceeds to the dynamic edge zone check 420. The dynamic edge zone check 420 determines whether multiple touch input are detected in the dynamic edge zone 320. In an embodiment, the dynamic edge zone 320 may range from 15 to 30 pixels, depending on the device's design.

In various embodiments, the dynamic edge zone check 420 determines a number of touch inputs is detected within the dynamic edge zone 320. When multiple fingers are detected, the dynamic edge zone expands in width. The extent of the expanded dynamic edge zone may be based on the number of detected touch inputs.

In various embodiments, the dynamic edge zone check 420 measures a distance between adjacent touch inputs in the dynamic edge zone 320. The measured distance between touch inputs may be compared to a predetermined threshold. If the measured distance is less than the predetermined threshold, the measured touch inputs are determined as invalid. When the dynamic edge zone check 420 determines that the touch inputs are invalid, the process flows to step 430, where the measured touch inputs are rejected and not reported.

If the touch input passes both the dynamic dead zone check 410 and the dynamic edge zone check 420, the touch input is determined to be a valid touch. The process proceeds to report the touch input in step 440, where the touch input is reported to the SoC or relevant applications for processing and response.

By implementing the dynamic dead zone check 410 and dynamic edge zone check 420, the touchscreen device can distinguish between intentional touches and accidental touches based on how the user is holding the device.

Figure 5:
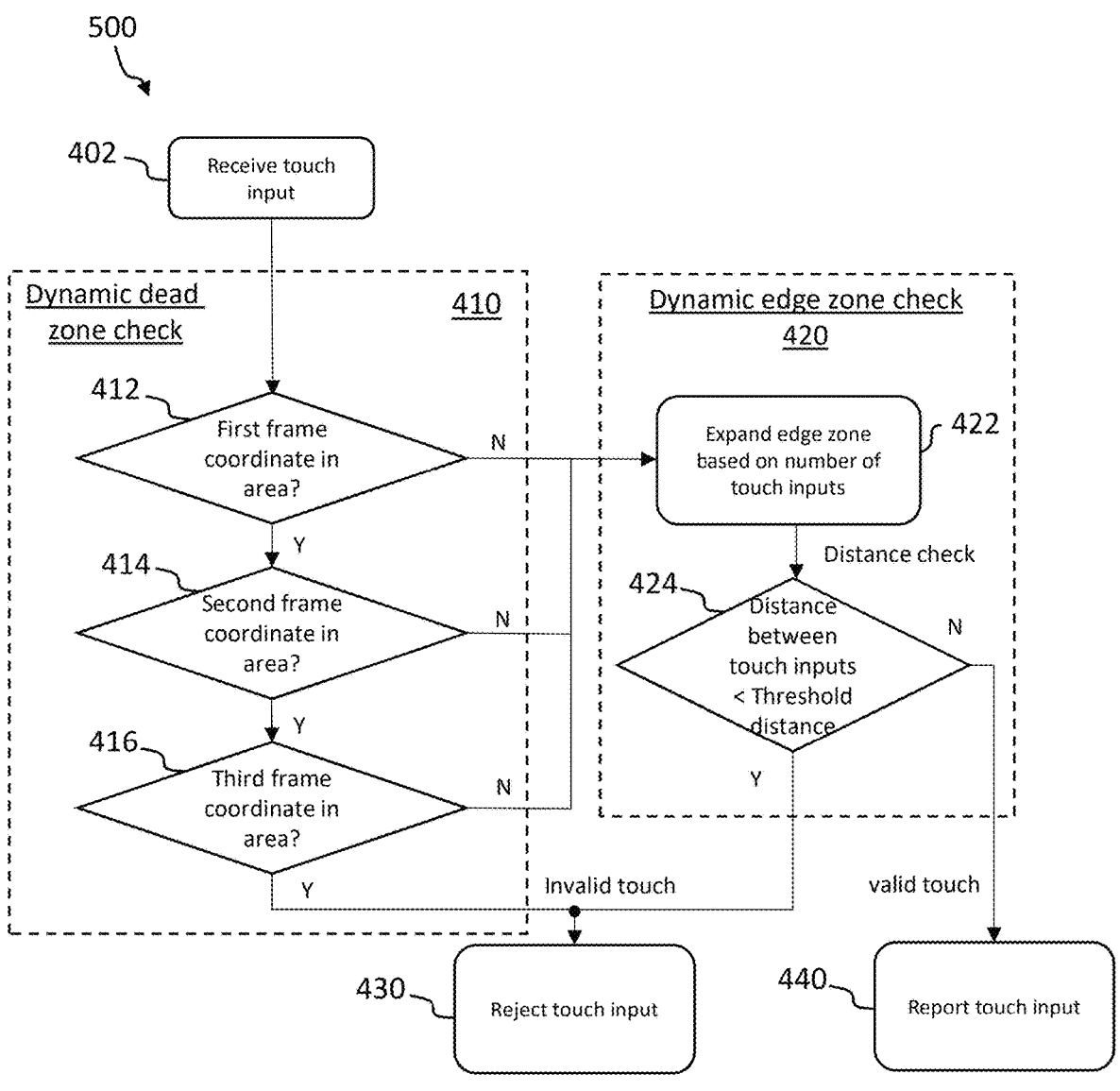
FIG. 5 illustrates a flowchart of a method for processing touch inputs according to an embodiment of the present application.

FIG. 5 illustrates a flowchart 500 of a method for processing touch inputs according to an embodiment of the present application. FIG. 5 illustrates a detailed flowchart that expands upon the flowchart 400 for processing touch inputs in FIG. 4. The flowchart 500 provides a detailed view of the dynamic dead zone check 410 and dynamic edge zone check 420.

The process begins with receiving a touch input 402, the touch input 402 may be a finger tap detected on an edge of the touchscreen 102. The dynamic dead zone check 410 includes three consecutive checks 412, 414, 416, each corresponding to a frame of touch input data. In some embodiments, the three consecutive frames may take 24.9 ms to complete at a frame rate of 120 Hz where each frame takes 8.3 ms to process. In some embodiments, the three consecutive frames may take 12.6 ms to complete at a frame rate of 240 Hz where each frame takes 4.2 ms to process. While the flowchart 500 illustrates three consecutive checks, the dynamic dead zone check 410 may include any number of consecutive checks. In various embodiments, the dynamic dead zone check 410 determines whether the coordinate of the touch input is within the defined dynamic dead zone 310 for that particular frame. If the touch input is within the dynamic dead zone 310 in all three consecutive frames (YES path from 416), the process determines that the touch input is an invalid touch and proceeds to reject the touch input in step 430.

In one or more embodiments, if the touch input is not within the dynamic dead zone 310 in any of the three frames (NO path from 412, 414, or 416), the process proceeds to the dynamic edge zone check 420. The dynamic edge zone check 420 begins with step 422, which expands the dynamic edge zone 320a based on a number of detected touch inputs in the dynamic edge zone 320a. The expanded dynamic edge zone 320b may adapt to different gripping patterns and hand sizes by rejecting multi-finger mistouches.

The dynamic edge zone check 420 proceeds to determine whether a distance between adjacent touch inputs is less than a predetermined threshold distance in step 424. If the distance between two touch inputs is less than the threshold distance (YES path), the touch inputs are considered invalid and proceeds to step 430.

If the distance between the touch inputs is greater than the threshold distance (NO path from 424), the touch input is considered valid. The dynamic edge zone check 420 proceeds to report touch input in step 440. The touch input is then reported to the device's operating system or relevant applications for further processing and response.

FIG. 6 illustrates a flowchart of a method of operating an electronic device with a touchscreen according to an embodiment of the present application.

The process 600 begins at step 602, where the device detects a plurality of touch inputs for a number of frames on a dead zone of the touchscreen. When the plurality of touch inputs are detected, the process proceeds to step 604. In step 604, the process determines a distance between adjacent touch inputs within an expanded edge zone. The expanded edge zone may correspond to the expanded dynamic edge zone as described in the context of previous figures. In one or more embodiments, the distance is compared to a threshold distance in the subsequent steps.

In step 606, in response to the determined distance being less than a threshold distance, the touch input is rejected as invalid. When touch inputs are close in proximity (less than the threshold distance) on the edge of the screen, the touch inputs are likely to be part of a grip pattern rather than intentional touch input.

In step 608, in response to the determined distance being greater than the threshold distance, the touch input is accepted as valid. In this case, the method accepts the touch inputs as valid and proceeds to report the finger touch. When touch inputs are spaced further apart (more than the threshold distance), the touch inputs are more likely to be intentional touch input rather than part of a grip pattern.

In various embodiments, the threshold distance in steps 606 and 608 may be dynamically adjusted based on factors such as the device's physical dimensions, the specific application in use, or user-defined preferences.

Example embodiments of the present invention are summarized here. Other embodiments can also be understood from the entirety of the specification and the claims filed herein. It is understood that various embodiments described herein can be combined.

Example 1. A first example comprises a method of operating an electronic device. The method includes detecting a plurality of touch inputs for a number of frames on an edge zone of a touchscreen of the device, determining a distance between adjacent touch input within an expanded edge zone, in response to the distance being less than a threshold distance, rejecting the touch inputs as invalid, and in response to the distance being greater than the threshold distance, accepting the touch inputs as valid.

Example 2. The method of example 1, the edge zone includes a dynamic dead zone and a dynamic edge zone adjacent to the dynamic dead zone.

Example 3. The method of examples 1 or 2, can further include determining a number of touch inputs from the plurality of touch inputs in the dynamic edge zone and expanding the dynamic edge zone to the expanded edge zone based on the number of touch inputs in the dynamic edge zone.

Example 4. The method of examples 1 to 3, the dynamic dead zone includes a width of three pixels or less.

Example 5. The method of examples 1 to 4, the dynamic edge zone can include a width of 13 to 30 pixels and the expanded edge zone can include a width greater than the dynamic edge zone.

Example 6. The method of examples 1 to 5, detecting the plurality of touch inputs for a number of frames can include: detecting the plurality of touch inputs in the dynamic dead zone for a predetermined number of frames; and in response to detecting the touch inputs in the dynamic dead zone for the predetermined number of frames, rejecting the touch inputs as invalid.

Example 7. The method of examples 1 to 6, the predetermined number of frames is three frames.

Example 8. A second example comprises a method of operating a touchscreen device having a first edge zone and a second edge zone along an edge of a touchscreen of the touchscreen device, the first edge zone having a first width and the second edge zone having a second width that is larger than the first width of the first edge zone. The method includes detecting touch inputs on the first edge zone, determining that there are at least two touch inputs on the second edge zone; in response to determining that there are at least two touch inputs on the second edge zone, expanding the second width of the second edge zone, and measuring a distance between adjacent touch inputs on the second edge zone.

Example 9. The method of example 8, the first edge zone can include a dynamic dead zone and the second edge zone can include a dynamic edge zone, where the second edge zone is adjacent to the first edge zone.

Example 10. The method of examples 8 or 9, the method can further include rejecting the at least two touch inputs in response to detecting that the measured distance between the adjacent touch inputs is less than a threshold distance.

Example 11. The method of examples 8 to 10, the first edge zone includes a width of three or fewer pixels.

Example 12. The method of examples 8 to 11, the second edge zone includes a width of 13 to 30 pixels.

Example 13. The method of examples 8 to 12, detecting the touch inputs on the first edge zone includes: detecting at least one touch input of the touch inputs in the first edge zone for a predetermined number of frames, and in response to detecting the touch inputs in the first edge zone for the predetermined number of frames, rejecting the touch input as invalid.

Example 14. The method of examples 8 to 13, the predetermined number of frames is three frames.

Example 15. A third example comprises a device that includes a display layer having a plurality of pixels, a touch sensing layer adjacent the display layer, the touch sensing layer having a plurality of sensors, each sensor associated with one or more of the pixels, a touch controller, and a non-transitory memory storing a program to be executed by the touch controller. The program comprising instructions to detect a plurality of touch inputs for a number of frames on an edge zone of a touchscreen of the device, determine a distance between adjacent touch input within an expanded edge zone, in response to the distance being less than a threshold distance, rejecting the touch inputs as invalid, and in response to the distance being greater than the threshold distance, accepting the touch inputs as valid.

Example 16. The device of example 15, the edge zone includes a dynamic dead zone, and a dynamic edge zone adjacent to the dynamic dead zone.

Example 17. The device of examples 15 or 16, further includes instructions to: determine a number of touch inputs from the plurality of touch inputs in the dynamic edge zone, and expand the dynamic edge zone to the expanded edge zone based on the number of touch inputs in the dynamic edge zone.

Example 18. The device of examples 15 to 17, the dynamic dead zone includes a width of less than three pixels.

Example 19. The device of examples 15 to 18, the dynamic edge zone includes a width of 13 to 30 pixels and the expanded edge zone includes a width greater than the dynamic edge zone.

Example 20. The device of examples 15 to 19, the instructions to detect the plurality of touch inputs for a number of frames includes instructions to: detect the plurality of touch inputs in the dynamic dead zone for a predetermined number of frames, and in response to detecting the touch inputs in the dynamic dead zone for the predetermined number of frames, reject the touch inputs as invalid.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating an electronic device, the method comprising:
   detecting a plurality of touch inputs for a number of frames in an edge zone along a length of a touchscreen of the device, the plurality of touch inputs being in the edge zone on the same edge of the touchscreen and the edge zone having a first width;
   expanding the edge zone along the length of the touchscreen to a second width in response to detecting the plurality of touch inputs in the edge zone of the touchscreen, wherein the second width is greater than the first width;
   detecting the plurality of touch inputs in the expanded edge zone;
   determining a distance between the detected touch inputs within the expanded edge zone;
   comparing the determined distance with a threshold distance;
   in response to the determined distance being less than the threshold distance, rejecting the detected touch inputs as invalid; and
   in response to the determined distance being greater than the threshold distance, accepting the detected touch inputs as valid.

2. The method of claim 1, wherein the edge zone comprises:
   a dynamic dead zone; and
   a dynamic edge zone adjacent to the dynamic dead zone.

3. The method of claim 2, further comprising:
   determining a number of touch inputs from the plurality of touch inputs in the dynamic edge zone,
   wherein expanding the edge zone comprises expanding the dynamic edge zone to the second width based on the number of touch inputs in the dynamic edge zone.

4. The method of claim 3, wherein the dynamic edge zone comprises a width of 13 to 30 pixels and wherein the expanded edge zone comprises a width greater than the dynamic edge zone.

5. The method of claim 2, wherein the dynamic dead zone comprises a width of three pixels or less.

6. The method of claim 2, wherein detecting the plurality of touch inputs for the number of frames comprises:

detecting the plurality of touch inputs in the dynamic dead zone for a predetermined number of frames; and in response to detecting the touch inputs in the dynamic dead zone for the predetermined number of frames, rejecting the touch inputs as invalid.

7. The method of claim 6, wherein the predetermined number of frames is three frames.

8. A method of operating a touchscreen device having a first edge zone and a second edge zone along a length of an edge of a touchscreen of the touchscreen device, the first edge zone having a first width and the second edge zone having a second width that is larger than the first width of the first edge zone, the first edge zone and the second edge zone being on the same edge of the touchscreen, the method comprising:

detecting touch inputs in the first edge zone;

detecting at least two of the touch inputs in the second edge zone;

in response to detecting the at least two touch inputs in the second edge zone, expanding the second edge zone from the second width to a third width along the length of the touchscreen;

detecting the at least two touch inputs in the expanded second edge zone;

determining a distance between the at least two touch inputs within the expanded second edge zone;

comparing the determined distance with a threshold distance; and determining whether the at least two touch inputs in the expanded second edge zone are valid in response to comparing the determined distance with the threshold distance.

9. The method of claim 8, wherein:

the first edge zone comprises a dynamic dead zone; and the second edge zone comprises a dynamic edge zone, wherein the second edge zone is adjacent to the first edge zone.

10. The method of claim 8, further comprising:

rejecting the at least two touch inputs in response to the determined distance between the at least two touch inputs being less than the threshold distance.

11. The method of claim 8, wherein the first edge zone comprises a width of three or fewer pixels.

12. The method of claim 8, wherein the second edge zone comprises a width of 13 to 30 pixels.

13. The method of claim 8, wherein detecting the touch inputs in the first edge zone comprises:

detecting at least one touch input of the touch inputs in the first edge zone for a predetermined number of frames; and in response to detecting the touch inputs in the first edge zone for the predetermined number of frames, rejecting the touch input as invalid.

14. The method of claim 13, wherein the predetermined number of frames is three frames.

15. A device comprising:

a display layer comprising a plurality of pixels;

a touch sensing layer adjacent the display layer, the touch sensing layer comprising a plurality of sensors, each sensor associated with one or more of the pixels;

a touch controller; and a non-transitory memory storing a program to be executed by the touch controller, the program comprising instructions to:

detect a plurality of touch inputs for a number of frames in an edge zone along a length of a touchscreen of the device, the plurality of touch inputs being in the edge zone on the same edge of the touchscreen and the edge zone having a first width;

expand the edge zone along the length of the touchscreen to a second width in response to detecting the plurality of touch inputs in the edge zone of the touchscreen, wherein the second width is greater than the first width;

detect the plurality of touch inputs in the expanded edge zone;

determine a distance between the detected touch inputs within the expanded edge zone;

compare the determined distance with a threshold distance;

in response to the determined distance being less than the threshold distance, reject the detected touch inputs as invalid; and in response to the determined distance being greater than the threshold distance, accept the detected touch inputs as valid.

16. The device of claim 15, wherein the edge zone comprises:

a dynamic dead zone; and a dynamic edge zone adjacent to the dynamic dead zone.

17. The device of claim 16, further comprising instructions to:

determine a number of touch inputs from the plurality of touch inputs in the dynamic edge zone, wherein the instructions to expand the edge zone further comprises instructions to expand the dynamic edge zone to the second width based on the number of touch inputs in the dynamic edge zone.

18. The device of claim 17, wherein the dynamic edge zone comprises a width of 13 to 30 pixels and wherein the expanded edge zone comprises a width greater than the dynamic edge zone.

19. The device of claim 16, wherein the dynamic dead zone comprises a width of less than three pixels.

20. The device of claim 16, wherein the instructions to detect the plurality of touch inputs for the number of frames comprises instructions to:

detect the plurality of touch inputs in the dynamic dead zone for a predetermined number of frames; and in response to detecting the touch inputs in the dynamic dead zone for the predetermined number of frames, reject the touch inputs as invalid.

* * * * *